United States Patent [19]

Adolph et al.

[11] Patent Number: 5,785,347
[45] Date of Patent: Jul. 28, 1998

[54] OCCUPANT SENSING AND CRASH BEHAVIOR SYSTEM

[75] Inventors: Eudora F. Adolph, Commerce Township; Paul A. Witt, Farmington Hills; Emmanuel Garcia, Bloomfield; John A. Musiol, Southfield; Raymond J. Vivacqua, Northville; James C. Lotito, Warren, all of Mich.; Robert Alden Lewis, Sunnyvale, Calif.

[73] Assignees: Siemens Automotive Corporation, Auburn Hills; AlliedSignal Inc., Sterling Heights, both of Mich.

[21] Appl. No.: 734,768

[22] Filed: Oct. 21, 1996

[51] Int. Cl.⁶ ............................................ B60R 21/32
[52] U.S. Cl. ................................... 280/735; 180/273
[58] Field of Search ........................ 280/735; 180/273

[56] References Cited

U.S. PATENT DOCUMENTS

| | | | |
|---|---|---|---|
| 5,330,226 | 7/1994 | Gentry et al. | 280/735 |
| 5,398,185 | 3/1995 | Omura | 280/735 |
| 5,446,661 | 8/1995 | Gioutsos | 280/735 |
| 5,515,933 | 5/1996 | Meyer et al. | 180/273 |
| 5,528,698 | 6/1996 | Kamei et al. | 280/735 |

*Primary Examiner*—Kenneth R. Rice
*Attorney, Agent, or Firm*—Russel C. Wells

[57] ABSTRACT

An occupant sensing and crash behavior system for a motor vehicle determines the presence and location of an occupant to then control the deployment of supplemental restraint systems such as air bags or inflatable seat/shoulder belts. Crash anticipation and crash severity sensors provide additional inputs to the system to determine the behavior of the crash and the occupants therein. An infrared sensor emits a plurality of beams to determine the location and position of the occupant as does a proximity sensor located on the air bag door or the occupant seat. Occupant weight plus the presence and orientation of a child seat are considered. Seat belt control is provided to control the length of the seat belt during an impact or crash.

27 Claims, 4 Drawing Sheets

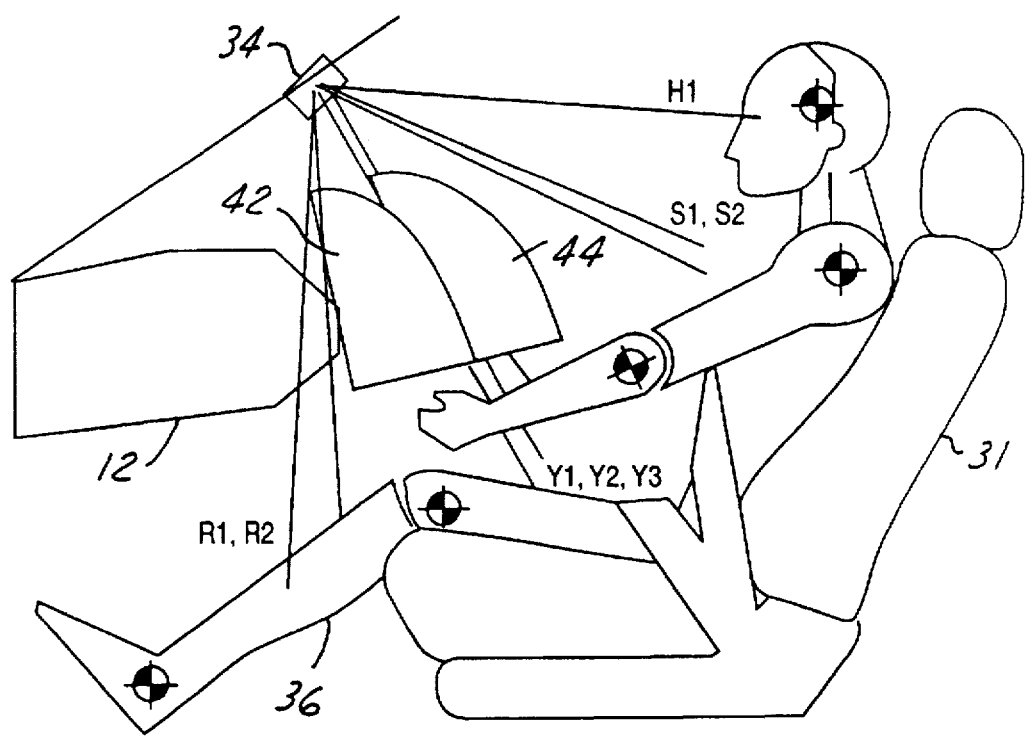
FIG.5
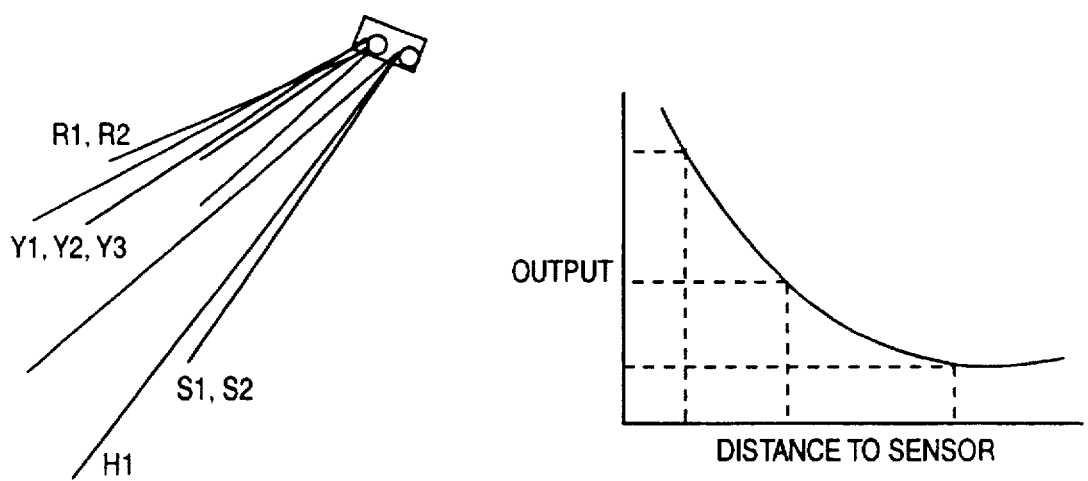
FIG.6
FIG.10

OCCUPANT SENSING AND CRASH BEHAVIOR SYSTEM

This invention relates to occupant sensing in motor vehicles and more particularly to the determination of the character and location of the occupant, the occupant's behavior and the vehicle crash behavior prior to and during the moments of the impact.

BACKGROUND OF THE INVENTION

In the present vehicle systems, there is located in the dashboard of the vehicle an air bag system comprising an inflatable air bag and an inflator that is electrically activated. The activation of the inflator is generally in response to electrical signals generated by one or more impact sensors positioned on the front of the vehicle. Other sensors may be positioned to respond to side impacts on the vehicle. Electrical signals generated from such sensors are supplied to an electronic control unit (ECU) wherein they are combined with other electrical signals to generate a firing signal.

It has been found that the character of the occupant, be the occupant a human or an inanimate object, an infant, young person, small sized adult or a full or large size adult requires different deployment conditions of the air bag. As an example if an infant is in a child seat on the passenger side, deployment of the air bag may be curtailed depending on whether or not the infant is facing forward or rearward in the child seat.

A small size adult does not need the strong force from an air bag that a larger size adult requires to be sufficiently restrained in the event of a crash.

In order to determine the characteristic of the occupant, weight sensors are located in the seat which help determine the relative weight range of the occupant, such as if the occupant weighs more or less than a predetermined amount.

SUMMARY OF THE INVENTION

It is an object of the system to provide an adaptive restraint system which provides the appropriate restraint response under crash or impact conditions depending on the vehicle and passenger compartment immediate situation. This system consists of variable inflating airbags and constant force seat belt retractors; passenger compartment sensors providing information on the area in front of the airbags and in the seats; pre-crash sensors which look for collisions and predict crash severity; and a system controller which verifies a crash occurrence and then takes the input from the sensors to direct the inflation of the airbags or force of the seat belts appropriately in a crash situation based on both the passenger compartment situation and the predicted crash severity.

The passenger compartment situation is determined by several input devices all of which may be used together or in some combination: One such input device is a PPD/CPOD (Passenger Presence Detection/Childseat Presence and Orientation Detection) seat mechanism which detects the presence of an object or cooperative childseat and the childseat's orientation. Another such input is from an infrared sensor mounted in the A-pillar or other frontal area which monitors the critically dangerous area in front of the airbag for an object and verifies its data by monitoring the seat area. A third input is a reflective capacitive sensor mounted in the dash which monitors for an object with high moisture content in the critically dangerous area in front of the airbag.

In addition another input may be a radar sensor mounted in the seat, dash, or head area, which monitors for a human occupant in a dangerous side or frontal zone by measuring heart, chest, or lung movement.

The data from each sensor is analyzed individually and in combination to resolve limitations on each sensing technology and to develop a complete and accurate view of the passenger compartment situation.

These and other objectives are accomplished by an occupant sensing and crash behavior system in a motor vehicle of the present invention. The system has a crash sensor for determining the presence of a crash or impact condition of the vehicle. The crash sensor in response to such impact operates to generate a crash signal. An inflator means responds to a firing signal to operate the release of an inflatable gas. The inflatable gas is supplied to a restraint means, such as an air bag or an inflatable seat belt thereby operating to restrain the occupant from moving forward in his or her seat as a result of the crash.

A child seat means for detecting the presence and front facing orientation of child seat on the vehicle seat generates a child seat electrical signal indicating both the presence and the proper orientation of the child seat or the absence of a child seat. To determine the size of the occupant, a weight sensing means responds to the weight of the occupant on the vehicle seat for generating a weight sensing signal. All of the aforementioned electrical signals are individually one of a plurality of vehicle parameter signals.

A presence and location sensor generates an electrical signal indicating the presence of an occupant in the vehicle seat and also the location of the occupant relative to said presence and locating sensor. The sensor generates the presence and location signal as another of said vehicle parameters signals.

An electronic control unit responds to the crash signal, the child seat electrical signal and said other vehicle parameter signals to generate an electrical firing signal. The firing signal is supplied to the inflator means thereby releasing said inflatable gas to controllably inflate the restraint means.

These and other objects will become apparent from the following drawings and detailed description.

DETAILED DESCRIPTION OF THE DRAWINGS

In the drawings:

FIG. 5 is a schematic view of an infrared sensor of FIG. 4;

FIG. 6 is a schematic view of the direction of the beams from the sensor of FIG. 4;

FIG. 10 is a graph illustrating the operational range of the sensor of FIG. 9.

DETAILED DESCRIPTION

Figure 1:
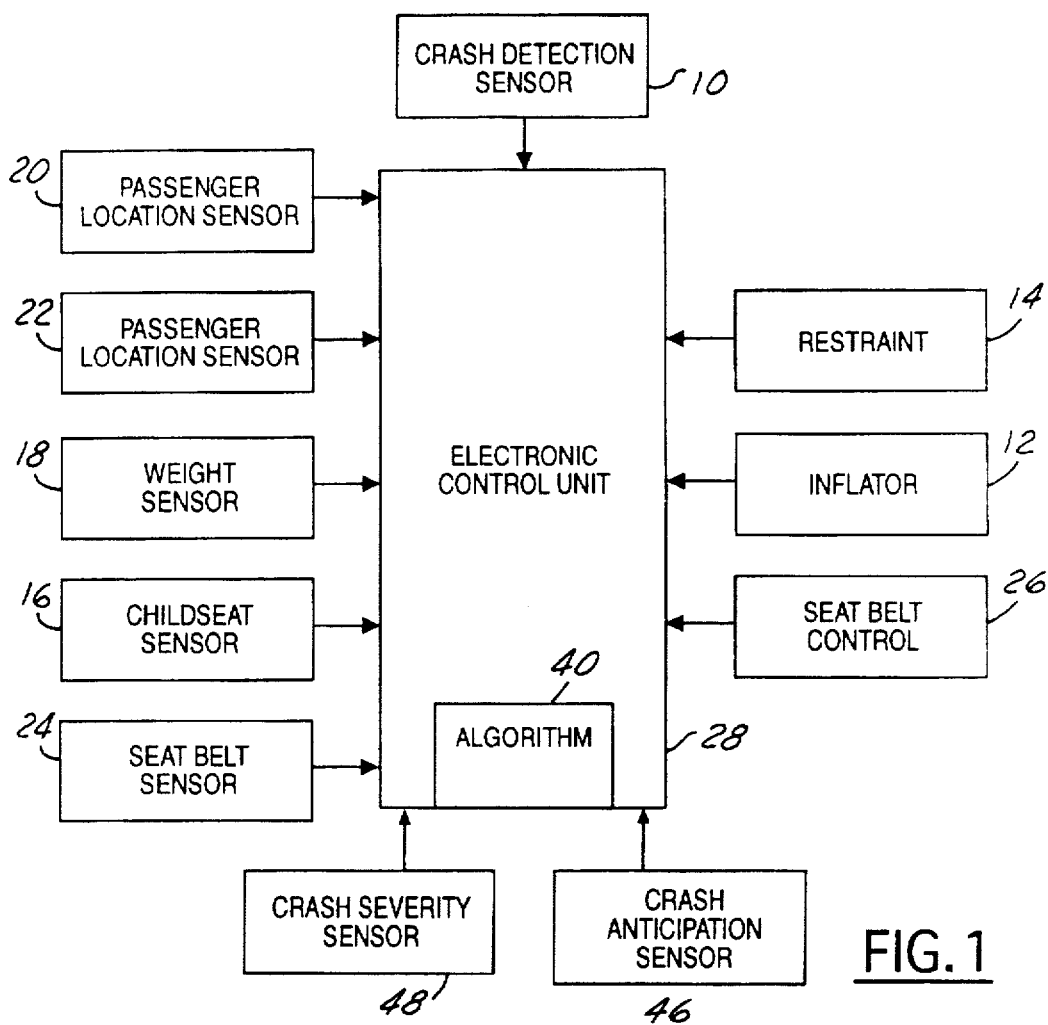
FIG. 1 is a block diagram of the occupant sensing and crash behavior system.
Figure 2:
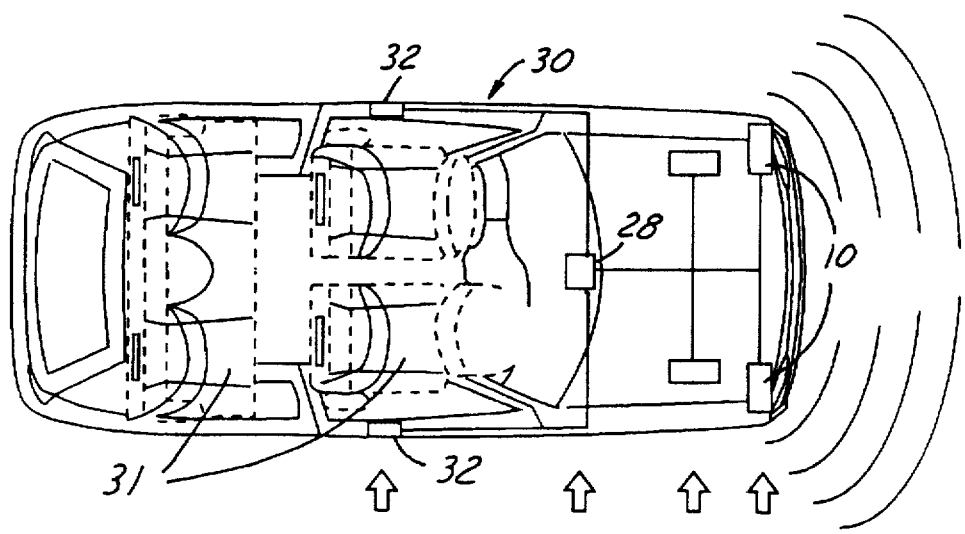
FIG. 2 is a top schematic view of the location of the several elements of the system of FIG. 1 in a motor vehicle.

Referring to the Figures by the characters of reference there is illustrated an occupant sensing and crash behavior system as found in a motor vehicle. The system has a crash sensor 10, an inflator means 12, a restraint means 14, a child seat sensor means for detecting the presence and orientation of a child seat 16, weight sensing means 1 8, a pair of presence and location sensors 20, 22 or passenger location sensors, a seat belt sensor 24, a seat belt control unit 26 and an electronic control unit (ECU) 28.

The crash or impact sensor 10 is typically located in the front of the motor vehicle 30 to detect the instance of a frontal impact. In some systems there are three such sensors with two located in the area of the headlights and a third or discriminating sensor located near the passenger compartment. The sensors, be they one or more, determine the presence of a crash condition of the vehicle and generate a crash signal. This signal is, for the purpose of this system, a vehicle parameter signal in that it gives an indication of the severity of the impact as it would effect an occupant 36 of the vehicle.

In addition, one or more side impact sensors 32 may be located on each side of the vehicle 30 to determine if a side impact is taking place. Many times only the frontal or the side impact sensors are actuated in an impact.

An inflator means 12, which is a unit that typically generates an inflatable gas started by an electrical signal or a firing signal. The inflatable gas is supplied to a restraint means 14 such as an airbag or a variable or an inflatable seat and shoulder belt. The restraint means 1 4 operates to restrain the occupant from moving forward in the passenger compartment as a result of the sudden deceleration of the motor vehicle 30.

A weight sensing means 18 which is typically positioned in the seat 31 portion of the vehicle seat or mounted to another portion of the seat assembly, responds to the presence of weight on the vehicle seat and operates to generating a weight signal. This weight signal is classified as one of the plurality of vehicle parameter signals;

A child seat sensor means 1 6, typically associated with a child seat, detects the presence and front facing orientation of child seat on the vehicle seat and generates a child seat electrical signal, which again is a vehicle parameter signal. Of course if no child seat is present, the signal also notes this condition. The sensor means is operable to generate the child seat electrical signal indicating both the presence and the orientation of the child seat. If the child seat positions the child to face the rear of the vehicle, this condition is noted and as will be seen, the air bag does not deploy.

A presence and location sensor 20, 22 generates an electrical signal indicating the presence of an occupant in the vehicle seat. The location function of the sensor determines the location of the occupant relative to the presence and location sensor. The signal generated will indicate the presence or absence and location of the occupant and is another of the vehicle parameters signals. In the preferred embodiment, there are two presence and location sensors 20, 22 in the system, the first sensor 20 is a proximity or reflective capacitive sensor and the second sensor 22 is an infrared sensor. Other forms of such sensors include ultra sound sensors and photographic sensors.

All of the vehicle parameter signals are electrically connected to an electronic control unit (ECU) 28 for generating the electrical firing signal to the inflator means 12. Within the ECU, there are many parameters stored to modify, according to an algorithm, the mixing of the vehicle parameter signals to generate the proper and correct firing signal. It is a function of the ECU 28 and its contents to make the overall system and adaptive or intelligent system for use in a motor vehicle. Typically some of the vehicle parameter signals will function to halt or not initiate deployment of the restraint means 14 while some other vehicle parameter signals, along with the algorithms in the ECU 28 will function to release the inflatable gas to controllably inflate the restraint means 14.

The weight sensing means 18 generates a predetermined weight sensing signal according to one of a plurality of weight ranges on the seat. For instance in one set-up the weight sensing means will indicate if the weight is absent, less than 12 Kg or greater than 12 Kg. Still in other designs, the weight sensor will generate a variable signal depending on the weight in a plurality of weight classes; i.e. less than 12 Kg., between 12 and 35 Kg., between 35 and 75 Kg. and greater than 75 Kg. The weight sensing means 1 8 is typically located in the seat portion of the vehicle seat and the weight of the item in the seat effective bears down on the sensor 18. Other locations which do not require seat modification may use sensors that are is located proximate the vehicle seat such as on the side of the seat, the back of the seat or other locations on the seat assembly.

One of the presence and location sensors 20 function, depending upon their location in the motor vehicle 30 to generate the presence and location signal relative to the position of inflator means 12. In this condition, the sensor may be located on or below the door of the air bag.

The second presence and locating sensor in preferred embodiment is an infrared sensor 34 which is located above and in the frontal area of the occupant. For the purposes of this description this sensor 34 is identified as a second sensor. As will be hereinafter shown, the infrared sensor 34, as illustrated in FIGS. 4–8 generates a plurality of infrared beams to determine the position of the occupant 36 and the location of the occupant relative to the sensor Since in the preferred embodiment the sensor is located in the "A" pillar 38 of the motor vehicle, the algorithm 40 in the ECU 28 functions to translate the signals generated by the infrared sensor 34 to describe the location of the occupant relative to the restraint means 14. Another location of the infrared sensor may be near the door or other frontal regions. The important consideration is to determine that the sensor can detect any part of the appendages of the occupant 36 which are very close to the restraint means 14 such as to the air bag. As an example, if the hands or feet of the occupant 36, or the occupant itself is "right against" the air bag when it is deployed, the force of the air bag may be unduly strong.

To accomplish this, the infrared sensor 34 emits eight infrared beams to interrogate the space between the front of the vehicle seat 31, the restraint means 14 and the seat area itself. Two of the defined portions of the space are within a predetermined distance from the location of the air bag, such as less than six inches 0–1 5.24 cm, and between six and ten inches, 15.24 and 25.4 cm. The first space allocation is called a red zone 42 and will require a soft deployment of the air bag to lessen undue injury to the out of position occupant. The second space allocation is called a yellow zone 44 and will require a moderate deployment of the air bag or a reduction in the normal force of deployment. The next three defined portions of the space are between said predetermined distance, the yellow zone 44 and the back is of the occupant seat to identify an occupant 36 might be leaning forward. The last set of three defined portions of the space correspond to the upper body, typically the right and left shoulder area and head of the occupant. From the information generated by these eight beams, the ECU 28, under control of its algorithm 40, can determine if an occupant 36 is standing next to the air bag such being a small child; or has his or her arms, hands and feet resting on the air bag door or very close thereto; or is leaning forward or is a very large person and by knowing where the upper body torso is can determine if the occupant is out the normal location and is leaning left or right. The information about the head, also verifies the position of the occupant relative to the position of the restraint means.

More particularly if the restraint means is an air bag the first sensor 20 is positioned in very close proximity to the air bag door. This sensor 20 senses the presence and location of an occupant 36 relative to the air bag. In the preferred embodiment this first sensor is a reflective capacitive sensor in that it is operable to respond to the change in the electric field emitted by the sensor. The field is changed due to the dielectric properties of the occupant 36 and generates an electrical signal when the electric field is other than a predetermined value. Typically the field is changed due to the water content of the occupant of the seat. As illustrated in FIG. 10, such a sensor does not have a large field in which to sense. The signal generated is supplied to the electronic control unit 28 as another of said vehicle parameter signals.

Since this is a system for both sensing the position of the occupant, if there is one, it is also a system that can determine the crash behavior. Crash behavior is, for the purposes of this description, the characteristic of the impact or the impending impact of the vehicle. In order to do this there is additionally included crash anticipation sensor 46 means for sensing an anticipated crash of the motor vehicle and generating a crash anticipated electrical signal. This signal is supplied to the electronic control unit 28 and maybe considered another vehicle parameter signal. Such a sensor 46 may well be a radar based sensor that interrogates a zone around the vehicle and detects an intrusion in that zone. Once the intrusion is detected, the signal in effect conditions the ECU to begin preparation of the deployment of the proper restraint means 14 such as an air bag, either frontal or either side air bag, or any combination thereof. The advantages of this anticipated crash or impact is to both reduce the time needed for deployment after the crash occurs and determine optimum restraint deployment, thereby resulting in the occupant to be better protected.

Another behavioral signal is generated from a crash severity sensor 48 which responds to the actual impact or crash and by means of the algorithm in the ECU 28 is able to determine the severity of the impact or crash and to affect deployment of the restraint means 14 accordingly. The signal generated by this sensor 48 is yet another of the vehicle parameter signals which is used within the ECU 28 to affect deployment of the restraint means.

Another embodiment of the inflator means 14 is a dual or multi stage inflator. In such an inflator, there is more than one inflator module which when taken together operate to effect the full, strong deployment of the inflatable gas to the restraint means. If the inflator 14 is a dual stage inflator, the first stage may only be ignited because the ECU 28 has determined that a very soft deployment is required. Once the first stage is deployed, the second stage will be deployed so as not to leave a "live" inflator in a damaged vehicle. It is calculated that if only a soft deployment is required, the system will delay firing the second stage for a predetermined time until it is anticipated that the occupant has been placed in the proper position for full deployment. Of course if a soft or moderated deployment is not indicated, the full strong deployment is made by the simultaneous or substantially simultaneous ignition of both or all stages of the inflator.

Another embodiment of the inflator means 14 is an infinitely variable inflator unit which is responsive to the firing signal from the electronic control unit. Such an inflator maybe constructed so as to control the emission of the inflator gas along different activation slopes. Such inflation will cause variable amounts of inflatable gas to be supplied to the restraint means for controlling the force impact from the restraint means on the occupant.

To determine the degree of deployment, the first and second sensors 20, 22 as previously described are used in their function. The ECU controls the sequential, simultaneous, partial or non-firing of the inflator 14. It is understood that not all impacts of the motor vehicle will require the deployment of a restraint means.

The firing signal generated by the ECU 28 to initiate the inflator means 14 may also be used to affect the operation of the seat belt control 26 means to restrain the forward movement of the occupant. Such an operation may be to effectively shorten the deployment of the seat or shoulder belt that is around the occupant. Such shoulder and seat belt, being typically an active part of the overall occupant restraint system, may not even be deployed and the effect of this control is negligible. Other uses of the firing signal is to activate seat/shoulder belt tensioners from the seat belt control 26 to function to restrain any movement of the occupant in the vehicle seat during the impact time. Such seat/should belt pretensioners also operate to restrain forward and sideward movement of the occupant.

Figure 3:
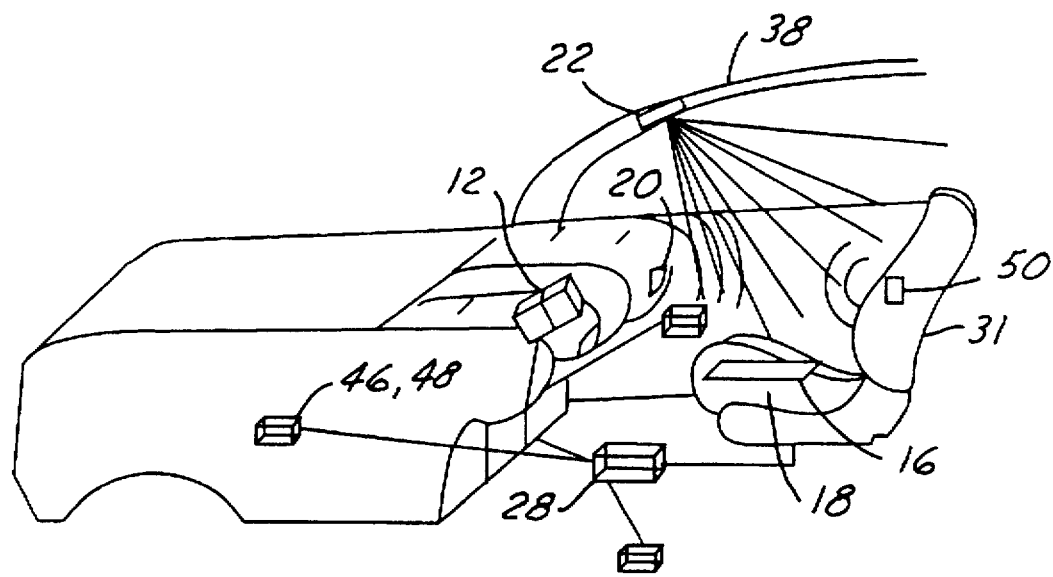
FIG. 3 is an isometric schematic view of the system of FIG. 2.
Figure 4:
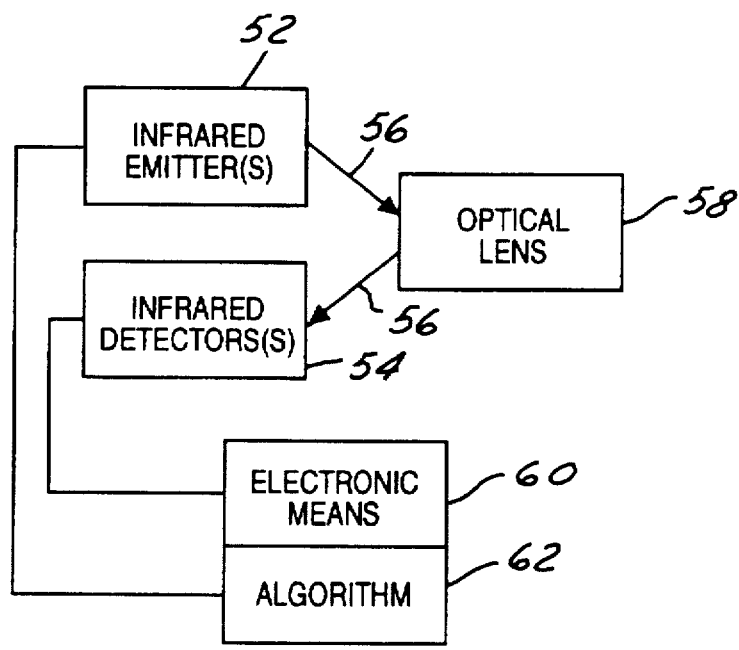
FIG. 4 is a block diagram of the infrared sensor.
Figure 7:
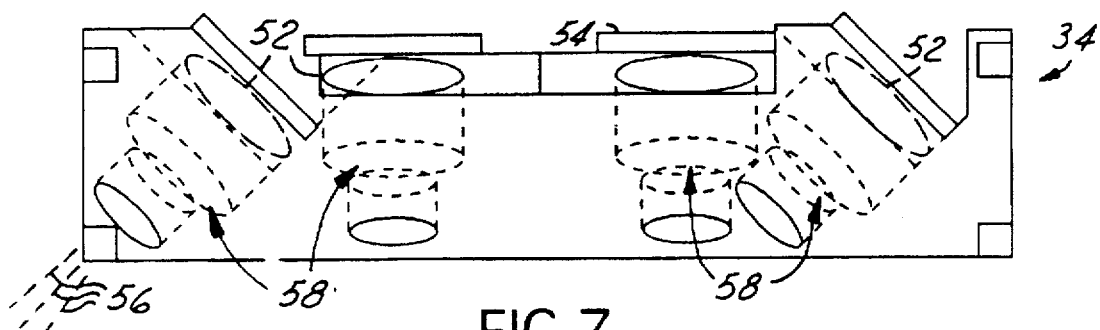
FIG. 7 is a diagrammatic view of the infared sensor of FIG. 4.
Figure 8:
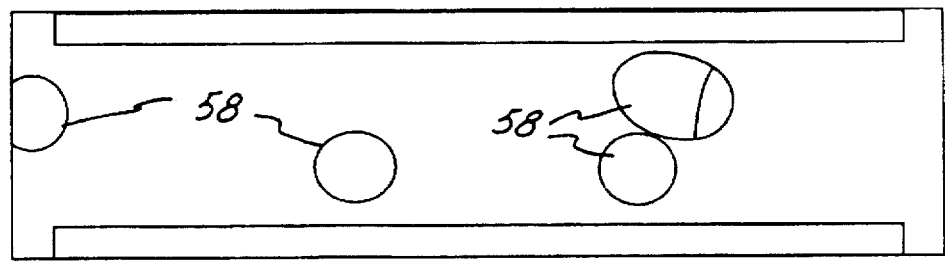
FIG. 8 is top view of the infared sensor of FIG. 7
Figure 9:
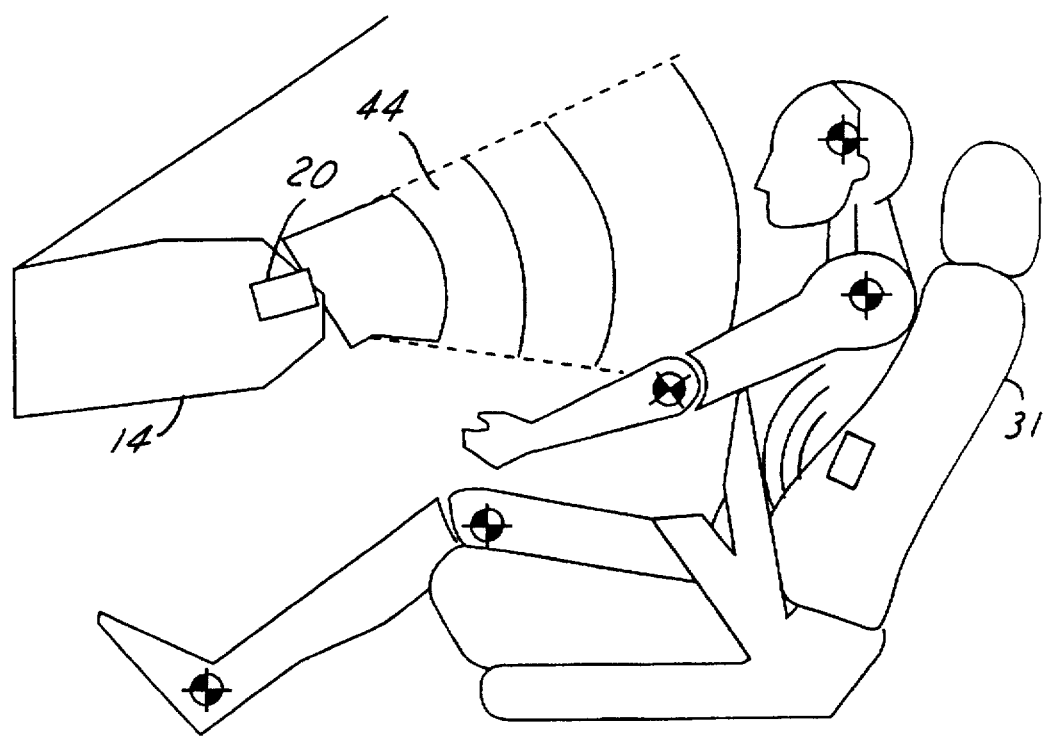
FIG. 9 is a schematic view of the reflective capacitive sensor.

In another embodiment of the occupant sensing and crash behavior system another first sensor 50 (FIG. 3), which is typically a reflective capacitive sensor, is positioned on the vehicle seat 31, typically on or in the seat back to sense the presence of an occupant. Since this sensor not only helps determine if the occupant is a human or just a bag of sticks, it also, by its signal generates information to the ECU 28 to identify the location of the occupant relative to the vehicle seat.

In yet another embodiment, another first sensor maybe located on the door of the vehicle to function to determine if the occupant is leaning against the door or is in close proximity thereto.

In still another embodiment, a radar sensor may be mounted in the seat, dashboard or in the head rest area of the seat to monitor for a human occupant. Such are typically required in the dangerous side impact. Such a sensor responds to heart beat or movement, chest movement or lung movement. From the information gathered by this sensor, a better view of the passenger compartment situation is determined.

In the preferred embodiment, the second sensor 22 is an infrared sensor 34 for sensing the presence and location of an occupant in a motor vehicle having an air bag. The sensor has a plurality of infrared emitters 52 for generating an infrared light beam from each emitter. An equal number of infrared detectors 54, equal to the number of infrared emitters, is respectively responsive to each emitter. Each detector is responsive to the light beam 56 from only one emitter. This control will be described hereinafter. An optical lens means 58 is positioned adjacent to the emitters 52 and detector 54 pairs for focusing the infrared light beams to predetermined locations in the motor vehicle 30 around the occupant 38. As previously described, this is to determine the actual location of the occupant. A small dedicated electronic means 60 is typically located in the housing of the sensor and is electrically connected each of the emitters and detectors. The electronic means 60 by means of its algorithm 62, is operable to selectively activate pairs of emitters and detectors and then to generate electrical signals to be supplied to the ECU 28. The electrical signals are responsive to the distance from the emitter 52 to where the light beam is broken. This distance is then converted into a distance measurement from a predetermined location, be it the sensor 34 itself or the air bag 14 which is positioned in a location that is typically other than that of the this infrared sensor. This distance can be determined through either triangulation theory or through the time of flight method.

In the preferred embodiment of the infrared sensor 34, the sensor comprises eight emitter 52 detector 54 sets with each emitter-detector set focused on a defined portion of the space surrounding the occupant. An emitter-detector set may have one or more emitters 52 and/or one or more detectors 54. In particular, the defined portions for the occupant sensing and crash behavior systems are the center of the headrest; the chest location, the edge of the seat and the airbag area. These three portions are covered by the eight beams of the present sensor. In yet another embodiment the number of emitter-detector sets is at least five which corresponds to the red and yellow zones and does not sense the headrest and the chest areas.

As illustrated in FIGS. 5 and 6, the beam which is directed to the center of the headrest is identified as H1. The purpose of this beam is to determine if the occupant head is in its proper location. The next two beams, labeled as S1 and S2 are aimed at a location which is typically the shoulder or chest location or upper body of the occupant. In the system these positions are below the head rest and inboard of the side edges of the seat or the normal position of an occupant in a bench seat configuration. The next three beams, labeled as Y1, Y2 and Y3, are aimed at a location, the yellow zone 44, that is forward of the edge of the vehicle seat and close to the air bag location. The final two beams, R1 and R2, are directed to an area, the red zone 42, that is very close to the airbag.

The electronic means 60 is connected to the emitter-detector pairs 52, 53, and functions to selectively turn on and off each individual pair and to convert by means of its algorithm 62 the elapsed time of the travel of the beam from the emitter, to the obstruction in its area and the reflected beam received by the detector into a pulse modulated signal. Each pulse modulated signal is identified as which signal it is, i.e. H1, Y1 or S1 and is supplied along a single signal line to the ECU 28. An internal clock means may be supplied in the electronic means or the ECU may supply such clocking single.

There has thus been described and illustrated an occupant sensing and crash behavior system for use in a motor vehicle. The system includes supplement restraint devices such as air bags or inflatable shoulder and seat belt assemblies, several sensors including a multi-beam infrared sensor and an electronic control unit which function to make the system an adaptive or intelligent vehicle system.

What is claimed is:

1. An occupant sensing and crash behavior system in a motor vehicle, the system comprising:
    a crash sensor for determining the presence of a crash condition of the vehicle and generating a crash signal;
    inflator means responding to a firing signal and operable to release an inflatable gas;
    restraint means responding to said inflatable gas and operable to restrain the occupant movement as a result of the crash; and
    child seat sensor means for detecting the presence and front facing orientation of child seat on the vehicle seat, said means operable to generate a child seat electrical signal indicating both the presence and the orientation of the child seat;
    weight sensing means responding to the weight on the vehicle seat and generating a weight sensing signal as one of a plurality of vehicle parameter signals;
    a presence and location sensor for generating an electrical signal indicating the presence of an occupant in the vehicle seat and the location of the occupant relative to said presence and locating sensor and supplying said presence and location signal to said electronic control means as another of said vehicle parameters signals; and
    an electronic control unit responding to said crash signal, said child seat electrical signal and said other vehicle parameter signals for generating an electrical firing signal to said inflator means thereby releasing said inflatable gas to controllably inflate said restraint means.

2. An occupant sensing and crash behavior system according to claim 1 wherein said weight sensing means generates a predetermined weight sensing signal according to one of a plurality of weight ranges on the seat.

3. An occupant sensing and crash behavior system according to claim 2 wherein said weight sensing means is located proximate the vehicle seat.

4. An occupant sensing and crash behavior system according to claim 1 wherein said presence and location sensor generates said presence and location signal relative to the position of said inflator means.

5. An occupant sensing and crash behavior system according to claim 1 wherein said presence and locating sensor is an infrared sensor located above and in the frontal area of the occupant, said infrared sensor for generating a plurality of infrared beams to determine the position of the occupant and the location of the occupant relative to said sensor.

6. An occupant sensing and crash behavior system according to claim 5 wherein said infrared sensor is located in the "A" pillar of a motor vehicle.

7. An occupant sensing and crash behavior system according to claim 1 wherein said restraint means is an air bag and additionally including a first sensor means for sensing the presence and location of an occupant relative to said air bag; said sensor operable to respond to the change in the electric field emitted by the sensor due to the dielectric properties of the occupant and to generate an electrical signal to said electronic control unit as another of said vehicle parameter signals when the electric field is other than a predetermined value.

8. An occupant sensing and crash behavior system according to claim 7 additionally including a second presence and location sensor for generating an electrical signal indicating the presence of an occupant in the vehicle seat and the location of the occupant relative to said second presence and locating sensor and supplying said presence and location signal to said electronic control means as another of said vehicle parameter signals.

9. An occupant sensing and crash behavior system according to claim 8 wherein said second presence and locating sensor is an infrared sensor located above and in frontal area of the occupant, said infrared sensor for generating a plurality of infrared beams to determine the position of the occupant and the location of the occupant relative to said sensor.

10. An occupant sensing and crash behavior system according to claim 9 wherein said infrared sensor is located in the "A" pillar of a motor vehicle.

11. An occupant sensing and crash behavior system according to claim 1 additionally including means for sensing an anticipated crash of the motor vehicle and generating a crash anticipated electrical signal to said electronic control unit.

12. An occupant sensing and crash behavior system according to claim 1 additionally including means for sensing the severity of the crash of the motor vehicle and generating a crash severity electrical signal to said electronic control unit.

13. An occupant sensing and crash behavior system according to claim 9 additionally including means for sensing an anticipated crash of the motor vehicle and generating a crash anticipated electrical signal to said electronic control unit.

14. An occupant sensing and crash behavior system according to claim 9 additionally including means for sensing the severity of the crash of the motor vehicle and generating a crash severity electrical signal to said electronic control unit.

15. An occupant sensing and crash behavior system according to claim 9 wherein said inflator means is a variable inflator having at least two inflators and in response to said firing signal from said electronic control unit whereby in response to said presence and location signals from said first and second sensors, said firing signal causes selective activation of one inflator to release an amount of inflatable gas to said restraint means operable to partially inflate said restraint means or both inflators to release the full amount of inflatable gas to said restraint means.

16. An occupant sensing and crash behavior system according to claim 1 additionally including seat belt retractor means operable in response to said firing signal for restraining forward movement of the occupant.

17. An occupant sensing and crash behavior system according to claim 1 additionally including seat belt tensioners operable in response to said firing signal for restraining forward movement of the occupant.

18. An occupant sensing and crash behavior system according to claim 7 additionally including another first sensor located on the vehicle seat for sensing the presence and location of an occupant relative to the vehicle seat.

19. An occupant sensing and crash behavior system according to claim 18 wherein said another first sensor is located on the back of the vehicle seat.

20. An occupant sensing and crash behavior system according to claim 7 additionally including another first sensor located on the vehicle door adjacent to the vehicle seat for sensing the presence and location of an occupant relative to the door.

21. An occupant sensing and crash behavior system according to claim 9 wherein said inflator means is an infinitely variable inflator means responsive to said firing signal from said electronic control unit in response to said presence and location signals from said first and second sensors, said firing signal causes variable amounts of inflatable gas to said restraint means for controlling the impact of said restraint means on the occupant.

22. An infrared sensor for sensing the presence and location of an occupant relative to a restraint means in a motor vehicle having an air bag, said sensor comprising:
 a plurality of infrared emitters for generating fan-shaped infrared light beams from each emitter;
 a number of infrared detectors equal to the number of infrared emitters and each said detector responsive to said light beam from only one of said emitters;
 lens means for focusing said infrared light beams to predetermined locations in the motor vehicle around the occupant to determine the location of the occupant relative to restraint means; and
 electronic means electrically connected to each of said emitters and detectors and operable to selectively activate pairs of emitters and detectors and to generate electrical signals responsive to the distance from the emitter where the light beam is broken.

23. An infrared sensor according to claim 22 wherein the sensor comprises at least five emitter-detector sets and each emitter-detector set is focused on a defined portion of the space surrounding the occupant for determining the location and movement of the occupant.

24. An infrared sensor according to claim 23 wherein two defined portions of the space are within a predetermined distance from the location of the air bag; three defined portions of the space are between said predetermined distance and the back of the occupant seat.

25. An occupant sensing and crash behavior system according to claim 1 additionally including means indicating the activation of seat belts around the occupant.

26. An infrared sensor according to claim 22 wherein the sensor comprises eight emitter-detector sets and each emitter-detector set is focused on a defined portion of the space surrounding the occupant for determining the location and movement of the occupant.

27. An infrared sensor according to claim 26 wherein two defined portions of the space are within a predetermined distance from the location of the air bag; three defined portions of the space are between said predetermined distance and the back of the occupant seat and a second three defined portions of the space correspond to the upper body and head of the occupant.

* * * * *